United States Patent [19]

Penzel et al.

[11] Patent Number: 4,731,402

[45] Date of Patent: Mar. 15, 1988

[54] FLOOR COVERING ADHESIVE BASED ON AQUEOUS POLYMER DISPERSIONS

[75] Inventors: Erich Penzel, Ludwigshafen; Lothar Maempel, Bruehl; Hans J. Neumann, Wachenheim; Karl-Clemens Peters, Bad Duerkheim; Oral Aydin, Mannheim, all of Fed. Rep. of Germany

[73] Assignee: BASF Aktiengesellschaft, Ludwigshafen, Fed. Rep. of Germany

[21] Appl. No.: 921,204

[22] Filed: Oct. 21, 1986

[30] Foreign Application Priority Data

Nov. 2, 1985 [DE] Fed. Rep. of Germany ....... 3538983

[51] Int. Cl.$^4$ .................. C08J 23/00; C08J 31/00; C08L 39/00
[52] U.S. Cl. .................... 524/273; 524/833; 524/813; 524/831; 524/561; 524/559; 524/555; 524/547; 524/817; 524/764
[58] Field of Search ............ 524/273, 833, 561, 831, 524/764, 817, 547

[56] References Cited

U.S. PATENT DOCUMENTS

| | | | |
|---|---|---|---|
| 2,384,882 | 9/1945 | Britton et al. | 524/273 |
| 3,407,159 | 10/1968 | Fink et al. | 156/327 |
| 3,696,082 | 10/1972 | Smith | 524/833 |
| 3,753,940 | 8/1973 | Trofimow | 524/833 |
| 4,322,330 | 3/1982 | Merz et al. | 523/221 |
| 4,341,679 | 7/1982 | Burgess et al. | 524/833 |
| 4,350,622 | 9/1982 | Hiyoshi et al. | 524/833 |
| 4,490,491 | 12/1984 | Devona et al. | 524/833 |
| 4,590,230 | 5/1986 | Kamada et al. | 524/273 |

*Primary Examiner*—Harold D. Anderson
*Assistant Examiner*—Dennis R. Daley
*Attorney, Agent, or Firm*—Oblon, Fisher, Spivak, McClelland & Maier

[57] ABSTRACT

Floor covering adhesives substantially comprising
A. a dispersion of a copolymer of
  20-60% by weight of vinylidene chloride
  34-80% by weight of a mixture of 40-80 parts by weight of esters of acrylic acid with $C_1$-$C_{18}$-alkanols and 20-60 parts by weight of vinyl esters and
  0.5 to 6% by weight of $\alpha,\beta$-monoolefinically unsaturated $C_3$-$C_5$-mono- and/or dicarboxylic acids and/or amides thereof and/or vinyl sulfonate,
B. 30-150 parts by weight (solid), based on 100 parts of a copolymer of A, of tackifying resins from the group of the rosins and derivatives thereof,
C. 0-50 parts by weight, based on 100 parts of resin B, of plasticizers and/or liquid resins and also, if desired,
D. fillers,
are shampoo-resistant and have a high peel strength.

13 Claims, No Drawings

FLOOR COVERING ADHESIVE BASED ON AQUEOUS POLYMER DISPERSIONS

The present adhesives for floor coverings comprise rosins, for example balsam resin WW, finely divided chalk and polyvinyl ethers, for example polyvinyl isobutyl ether of a molecular weight of from 2 to $3\times 10^5$ (Fikentscher K value 55-65) as plasticizer. They also contain from 20 to 30% by weight based on the rosin, of organi solvents, such as methanol, ethanol, ethyl acetate, toluene, benzin and other hydrocarbons. In general they contain mixtures of some of the solvents mentioned. Such adhesives are extensively used, since they have good processing properties, in particular at low temperatures, have high grab and produce strong adhesive bonds. The disadvantage is the relatively high level of organic solvent. Inhalation of solvent vapor exposes floorers to health risks. In addition, there have been instances of explosions causing damage and injuries. Finally, the release of solvent into the atmosphere amounts to sizable environmental pollution, given the total area of floor coverings laid each year.

An environmentally more acceptable option for use as binders in adhesive for floor coverings are aqueous polymer dispersions; the adhesives are then solvent-free.

Commercially available polymer dispersions which are suitable for use as binders are based on different monomers. Dispersions of butadiene and styrene are compounded with liquid resins, ie. resins having a melting point below 20° C., and small amounts of plasticizers and fillers, such as chalk and/or quartz powder. The disadvantage is in this case the ageing behavior of the adhesive bonds, which tend to become brittle with time.

Binders based on acrylic esters are ageing-resistant. However, adhesives prepared therefrom contain resin solutions and also small amounts of plasticizer, chalk and/or quartz powder. It is true that they are distinguished by excellent adhesion to customary coverings and substrates, but the small amount of organic solvents they contain, introduced with the resin solutions, is still a disadvantage.

Finally, aqueous dispersions of copolymers of ethylene and vinyl acetate in formulations prepared with hydrocarbon liquid resins, such as coumarone-indene resins, plasticizers and fillers are likewise used as floor covering adhesives. These adhesives have excellent wet grab. The disadvantages are that large amounts of resin are required and that, furthermore, the adhesive bonds are not water-resistant, so that the floor coverings can become detached on shampooing.

We have now found that floor covering adhesives which substantially comprise
A. a dispersion of a copolymer of
   20-60% by weight of vinylidene chloride
   34-80% by weight of a mixture of 40-80 parts by weight of esters of acrylic acid with $C_1$-$C_{18}$- alkanols and 20-60 parts by weight of vinyl esters and
   0.5 to 6% by weight of $\alpha,\beta$-monoolefinically unsaturated $C_3$-$C_5$-mono- and/or dicarboxylic acids and-/or amides thereof and/or vinyl sulfonate,
B. 30-150 parts by weight (solid), based on 100 parts of a copolymer of A, of tackifying resins from the group of the rosins and derivatives thereof,
C. 0-50 parts by weight, based on 100 parts of resin B, of plasticizers and/or liquid resins and also, if desired,
D. fillers are shampoo-resistant and have a high peel strength.

The preparation of the aqueous dispersions is not an object of the invention. They are prepared by a known emulsion polymerization method, using known emulsifiers and water-soluble initiators such as hydrogen peroxide or alkali metal persulfate, advantageously in combination with water-soluble reducing agents, such as formaldehyde sulfoxylate, thiosulfate, sodium pyrosulfite or ascorbic acid. The emulsifiers used are alkyl sulfates, alkylsulfonates, alkylarylsulfonates, preferably ethoxylated alkylphenols and/or sulfuric acid hemiesters thereof, in amounts of 1-4, preferably 1.5-3.5, % by weight, based on the monomers. The monomers are generally added to the reaction vessel in the form of an aqueous emulsion. Polymerization is effected at 30°-90° C., preferably 50°-70° C. The amount of vinylidene chloride is 20-60% by weight, based on the total monomers. The amount of acrylic acid esters and vinyl esters is 34-80% by weight. Preference is given to acrylic acid esters of alkanols of from 1 to 8 carbon atoms. Preferred vinyl esters are vinyl acetate and vinyl propionate, but vinyl butyrate, vinyl laurate and vinyl pivalate are also suitable. The ratio of acrylic acid to vinyl ester can in general be varied within the abovementioned limits and is preferably 50-70 parts by weight of acrylic ester and 30-50 parts by weight of vinyl ester. The $\alpha,\beta$-monoolefinically unsaturated mono- and/or dicarboxylic acid used is in particular acrylic acid, methacrylic acid, crotonic acid, itaconic acid or maleic acid, and suitable for use as the amide thereof are acrylamide, methacrylamide, crotonamide, itaconamamide, itaconamide, maleamamide and maleamide; the vinyl sulfonate can be in particular an alkali metal salt or the ammonium salt of vinylsulfonic acid. Their amount in the copolymer is preferably 1-4% by weight.

The average particle size of the dispersion is characterized by the light transmittance (LT value). The light transmittance is determined on a sample, diluted to 0.01% by weight, using a path length of 2.5 mm and an incident light wavelength of 0.546 $\mu$m. The film-forming capacity is indicated by the minimum film-forming temperature (MFT). The copolymer can be characterized by the glass transition temperature Tg, which is usually determined by DSC measurement (point of inflection taken as Tg).

The amount of tackifying resins is 30-150 parts by weight, preferably 60-100 parts by weight. The stated amount is based on 100 parts by weight of copolymer A (solid). The tackifying resin B from the group of the rosins is preferably balsam resin WW.

The amount of plasticizers and/or liquid resins is 0-50 parts by weight, preferably 5 30 parts by weight. The stated amount is based on 100 parts by weight of resin B. The preferred plasticizers are polypropylene glycol alkylphenol ethers. Liquid resins are resins having a melting point below 20° C., and are preferably coumarone-indene resins.

The fillers used, if desired, are finely ground or precipitated chalks and/or fine quartz powder. The floor covering adhesive can further contain antifoams, for example based on mineral oils or silicones, and thickeners, for example based on (meth)acrylic acid (co)polymers.

A typical formulation of an adhesive for floor coverings contains
33 parts of a dispersion having a solids content of 55 percent by weight,
35 parts of a 70% strength resin solution (in toluene), 2 parts of a commercially available plasticizer based on plypropylene glycol alkylphenols,
10 parts of chalk (particle diameter 3–4 μm),
20 parts of quartz powder (average particle diameter 9.5 μm) and
5 parts of commercially available thickener (for example based on a 4% strength aqueous solution of a (meth)acrylic acid/ethyl acrylate copolymer).

The mixture is stirred and thoroughly mixed and left to stand for 8 days, when it can be used.

The adhesive can be applied to the substrate for example by means of a comb or a plastic roller. After the customary air-drying time, the floor covering is laid. In terms of processibility, the novel adhesive resembles solvent-containing adhesives. It has a surprisingly high grab, which is still satisfactory at 10° C. Other surprising effects are the high shampoo resistance and the high alkali resistance of the adhesive bonds. The adhesive bonds are moreover plasticizer-resistant, and their peel values are "good" to "very good" (the peel values being tested in accordance with German Standard DIN 53,278 "Test of resistance to peeling of adhesive bonds containing disperse adhesives" after an air-drying time of 10 minutes).

In the examples below, parts and percentages are by weight, unless otherwise stated. Parts by volume relate to parts by weight as the liter relates to the kilogram.

EXAMPLE 1

The aqueous dispersion is prepared in a pressure-resistant polymerization kettle of 200 parts by volume capacity, equipped with a stirrer, a feed kettle of 150 parts by volume and two feed vessels of 10 parts by volume each.

The kettle is initially charged with: 12.38 parts of water, 0.18 part of potassium peroxodisulfate and 4.47 parts of feed I. The temperature is raised to 60°–70° C., and continuous addition is begun, at 45° C. of feeds I and II, which are added in the course of 3–4 hours. The reaction mixture is then held at 60° C. for a further 3 hours, flushed with nitrogen, cooled and brought with 15% strength ammonia (feed III) to pH 7–8.

Feed I is an aqueous emulsion of 21.07 parts of water, 23.18 parts of vinylidene chloride, 23.18 parts of n-butyl acrylate, 11.59 parts of vinyl acetate, 1.16 parts of acrylic acid, 0.58 part of acrylamide and 1.16 part of a 25% strength aqueous solution of sodium vinylsulfonate, emulsified with a mixture of 1.66 parts of a 35% strength aqueous solution of the sodium salt of the sulfuric acid hemiester of para-isooctylphenol condensed with 25 moles of ethylene oxide, and 2.02 parts of an aqueous 20% strength solution of para-isooctylphenol condensed with 25 moles of ethylene oxide. Feed II comprises a solution of 0.01 part of ascorbic acid in 1.84 parts of water. The dispersion has a solids content of 59.5% and an LT value of 33%. MFT is below 3° C., and Tg is 8° C.

(a) 1.76 parts of the aqueous dispersion are mixed with 0.064 part of commercially available plasticizer based on polypropylene glycol alkylphenols, 0.006 part of commercially available antifoam based on a mixture of mineral oil and silicone oil, 0.8 part of chalk, 0.6 part of quartz powder (average particle diameter 9.5 μm) and 0.68 part of a 70% strength solution of balsam resin WW in toluene. The resistance to peeling of PVC stuck with an approximately 1 mm thick layer of the adhesive to asbestos cement, after thorough cleaning of the surfaces prior to bonding, is, after 10 minutes of air-drying, 30.1 N/cm.

(b) A second mixture is prepared with a higher amount of resin. This mixture comprises 1.16 parts of dispersion, 0.4 part of chalk, 0.8 part of the quartz powder, 0.2 part of a 4% strength commercially available aqueous thickener solution (ethyl acrylate/(meth)acrylic acid copolymer) and 1.48 parts of a 70% strength solution of balsam resin WW in toluene. The resistance to peeling of PVC bonded with an approximately 1 mm thick layer of adhesive to asbestos cement after thorough cleaning of the surfaces is, after 10 minutes of air-drying, 24.0 N/cm.

EXAMPLE 2

To prepare the dispersion, the method of Example 1 is followed: the initial charge contains 13.68 parts of water, 0.16 part of sodium peroxodisulfate, 0.13 part of a 40% strength solution of the sodium salt of $C_{15}$-paraffinsulfonate and 7.04 parts of feed I. Feed I is an aqueous emulsion of 23.10 parts of water, 20.64 parts of vinylidene chloride, 20.64 parts of n-butyl acrylate, 10.32 parts of vinyl propionate, 1.03 parts of acrylic acid, 1.03 parts of a 50% strength aqueous solution of acrylamide and 1.03 parts of a 25% strength aqueous solution of sodium vinylsulfonate, emulsified with 3.69 parts of a 35% strength aqueous solution of the sodium salt of the sulfuric acid ester of para-isooctylphenol condensed with 25 moles of ethylene oxide and 2.58 parts of a 20% strength solution of para-isooctylphenol condensed with 10 moles of ethylene oxide. Feed II is a solution of 0.01 part of ascorbic acid in 1.64 parts of water. The dispersion has a solids content of 55.5% and an LT value of 72%. MFT is below 3° C., and Tg is 7° C.

(a) 2.07 parts of the aqueous dispersion are mixed with 0.154 part of a 2% strength aqueous solution of a commercially available thickener (based on an ethyl acrylate/(meth)acrylic acid copolymer), 0.06 part of a commercially available plasticizer (based on polypropylene glycol alkylphenol), 0.006 part of a commercially available antifoam based on a mineral oil/silicone oil mixture, 0.8 part of chalk, 1.74 parts of quartz powder (average particle diameter 9.5 μm) and 1.30 parts of a 70% strength solution of balsam resin WW in toluene. The resistance to peeling of PVC bonded with an approximately 1 mm thick layer of the adhesive to asbestos cement after thorough cleaning of the surfaces is, after 10 minutes of air-drying, 21.6 N/cm.

(b) A second mixture with more plasticizer is prepared from 2.18 parts of the aqueous dispersion, 0.3 part of the 2% strength aqueous thickener solution, 0.63 part of the plasticizer, 0.006 part of the antifoam, 0.42 part of chalk, 1.56 parts of a quartz powder and 0.75 part of the 70% strength solution of balsam resin WW. After an air-drying time of 10 minutes, the resistance to peeling of a bond prepared with an approximately 1 mm thick layer of adhesive between PVC and asbestos cement after thorough cleaning of the surfaces is 19.7 N/cm.

EXAMPLE 3

The dispersion is prepared by the method given in Example 1. The initial charge contains 13.96 parts of water, 0.16 part of ammonium peroxodisulfate, 0.19 part of a 15% strength aqueous solution of the sodium salt of dodecylbenzenesulfonate and 7.39 parts of feed I. Feed I is an aqueous emulsion of 23.38 parts of water, 15.75 parts of vinylidene chloride, 31.50 parts of vinyl propionate, 5.25 parts of n-butyl acrylate, 1.05 parts of methacrylic acid, 0.53 part of methacrylamide and 1.05 parts of a 25% strength aqueous solution of sodium vinylsulfonate, emulsified with 3.75 parts of a 35% strength aqueous solution of the sodium salt of the sulfuric acid ester of para-isooctylphenol condensed with 25 moles of ethylene oxide and 1.84 parts of a 20% strength aqueous solution of para-isooctylphenol condensed with 25 moles of ethylene oxide. Feed II is an aqueous solution of 0.01 part of formaldehyde sulfoxylate in 1.67 parts of water. The solids content of the resulting dispersion is 54.6%, and its LT value is 85%. MFT is 10° C., Tg is 15° C.

A mixture is prepared from 1.85 parts of the aqueous dispersion, 0.064 part of commercially available plasticizer based on polypropylene glycol alkylphenols, 0.006 part of commercially available antifoam based on mineral oils and silicone oils, 0.8 part of chalk, 0.6 part of quartz powder (average particle diameter 9.5 μm) and 0.68 part of a 70% strength solution of balsam resin WW in toluene. The resistance to peeling of PVC bonded with an approximately 1 mm thick layer of the adhesive to asbestos cement after thorough cleaning of the surfaces is, after 10 minutes of air-drying, 19.4 N/cm.

EXAMPLE 4

The dispersion is prepared by the method given in Example 1, except that the polymerization is carried out at from 45° to 55° C. The initial charge contains 13.88 parts of water, 0.13 part of a 40% strength aqueous solution of the sodium salt of $C_{15}$-paraffinsulfonate, 0.05 part of phosphoric acid, 0.44 part of a 30% strength aqueous solution of hydrogen peroxide and 7.12 parts of feed I. Feed I comprises an aqueous emulsion of 23.01 parts of water, 10.44 parts of vinylidene chloride, 31.31 parts of butyl acrylate, 10.44 parts of vinyl propionate, 1.04 parts of methacrylic acid, 0.52 part of acrylamide and 1.04 parts of a 25% strength aqueous solution of sodium vinylsulfonate emulsified with 3.72 parts of a 35% strength aqueous solution of the sodium salt of the sulfuric acid ester of para-isooctylphenol condensed with 25 moles of ethylene oxide and 1.82 parts of a 20% strength solution of para-isooctylphenol condensed with 25 moles of ethylene oxide. Feed II is a solution of 0.22 part of ascorbic acid and 0.0055 part of iron (II) sulfate in 1.90 parts of water. The solids content is 54.3% and the LT value is 79%. MFT is below 1° C., and Tg is −11° C.

A mixture is prepared from 1.72 parts of the dispersion obtained, 0.064 part of a commercially available plasticizer (based on polypropylene glycol alkylphenol), 0.006 part of commercially available antifoam (mixture of mineral oil and silicone oil), 0.8 part of chalk, 0.6 part of quartz powder (average particle diameter 9.5 μm) and 0.68 part of a 70% strength solution of balsam resin WW in toluene. After an air-drying time of 10 minutes the resistance to peeling of a bond prepared between PVC and asbestos cement with an approximately 1 mm thick layer of adhesive after thorough cleaning of the surfaces is 31.5 N/cm.

EXAMPLE 5

The dispersion is prepared by the method given in Example 1. The initial charge comprises 11.92 parts of water, 0.23 part of potassium peroxodisulfate and 7.08 parts of feed I. Feed I is an emulsion of 19.33 parts of water, 34.00 parts of vinylidene chloride, 17.00 parts of vinyl propionate, 5.67 parts of n-butyl acrylate, 1.13 parts of acrylic acid, 0.57 part of acrylamide and 1.13 parts of a 25% strength aqueous solution of sodium vinylsulfonate, emulsified with 4.05 parts of a 35% strength aqueous solution of the sodium salt of the sulfuric acid ester of para-isooctylphenol condensed with 25 moles of ethylene oxide and 1.98 parts of a 20% strength aqueous solution of para-isooctylphenol condensed with 25 moles of ethylene oxide. Feed II is a solution of 0.01 part of ascorbic acid in 2.48 parts of water.

The dispersion obtained has a solids content of 59.3% and an LT value of 53%. MFT is 15° C. and Tg 18° C.

A mixture is prepared from 1.8 parts of the dispersion, 0.064 part of commercially available plasticizer, 0.006 part of commercially available antifoam, 0.8 part of chalk, 0.6 part of quartz powder (average particle diameter 9.5 μm) and 0.68 part of a 70% strength solution of balsam resin WW in toluene. After an airdrying time of 10 minutes the resistance to peeling of a bond prepared between PVC and asbestos cement with an approximately 1 mm thick layer of the adhesive after thorough cleaning of the surfaces is 19.4 N/cm.

We claim:
1. A floor covering adhesive consisting essentially of:
   (a) an aqueous dispersion of a copolymer of:
      (i) 20–60% by weight of vinylidene chloride,
      (ii) 34–80% by weight of a mixture of 40–80 parts by weight of esters of acrylic acid with $C_1$–$C_{18}$-alkanols and 20–60 parts by weight of one or more vinyl esters, and
      (iii) 0.5–6% by weight of α,β-monoolefinically unsaturated $C_3$–$C_5$-mono-or dicarboxylic acids or amides thereof or vinyl sulfonate, or a mixture thereof, and
   (b) 30–150 parts by solid weight, based on 100 parts of a copolymer of a), of a tackifying resin which is a rosin or a derivative thereof.
2. The floor covering adhesive of claim 1, wherein said vinyl ester is selected from the group consisting of vinyl acetate, vinyl propionate, vinyl butyrate, vinyl laurate and vinyl pivalate.
3. The floor covering adhesive of claim 2, wherein said vinyl ester is vinyl acetate or vinyl propionate.
4. The floor covering adhesive of claim 1, wherein said esters of acrylic acid are esters of acrylic acid with $C_1$–$C_8$ alkanols.
5. The floor covering adhesive of claim 1, wherein a ratio of acrylic acid ester to vinyl ester of about 50–70 to 30–50 parts by weight, respectively, is used.
6. The floor covering adhesive of claim 1, wherein said α,β- monoolefinically unsaturated $C_3$–$C_5$-mono- or dicarboxylic acid is selected from the group consisting of acrylic acid, methacrylic acid, crotonic acid, itaconic acid and maleic acid.
7. The floor covering adhesive of claim 1, wherein said α,β-monoolefinically unsaturated $C_3$–$C_5$-mnono- or dicarboxylic acid amide is selected from the group consisting of acrylamide, methacrylamide, crotonamide, itaconamamide, itaconamide, maleamamide and maleamide.
8. The floor covering adhesive of claim 1, wherein said vinyl sulfonate is an alkali metal salt or ammonium salt of vinyl sulfonic acid.
9. The floor covering adhesive of claim 1, wherein said α,β-monoolefinically unsaturated $C_3$–$C_5$-mono- or dicarboxylic acid or amide thereof or vinyl sulfonate, or a mixture thereof, is used in an amount of about 1–4% by weight.

10. The floor covering adhesive of claim 1, wherein said tackifying resin is used in an amount of 60–100 parts by weight.

11. The floor covering adhesive of claim 1, which further contains up to 50 parts by weight, based on 100 parts of resin (b), of a plasticizer or liquid resin or a mixture thereof, and wherein said plasticizer is a polypropylene glycol alkenyl phenol ether, and said liquid resin is a coumarone-indene resin.

12. The floor covering adhesive of claim 1, which further contains filler.

13. The floor covering adhesive of claim 12, wherein said filler is a finely ground or precipitated chalk or a fine quartz powder or a mixture thereof.

* * * * *